(12) United States Patent
Babitch et al.

(10) Patent No.: US 10,502,838 B2
(45) Date of Patent: Dec. 10, 2019

(54) DIGITAL REAL TIME CLOCK MONITOR FOR A GNSS RECEIVER AND SINGLE PIN SIGNALLING FOR POWER-ON RESET AND WAKE-UP INTERRUPT

(71) Applicant: Samsung Electronics Co., Ltd., Gyeonggi-do (KR)

(72) Inventors: Daniel Babitch, San Jose, CA (US); Steven A Gronemeyer, Cedar Rapids, IA (US); Nicolas Vantalon, Carros (FR)

(73) Assignee: Samsung Electronics Co., Ltd (KR)

( * ) Notice: Subject to any disclaimer, the term of this patent is extended or adjusted under 35 U.S.C. 154(b) by 231 days.

(21) Appl. No.: 15/591,510

(22) Filed: May 10, 2017

(65) Prior Publication Data

US 2017/0242130 A1    Aug. 24, 2017

Related U.S. Application Data

(63) Continuation of application No. 14/328,143, filed on Jul. 10, 2014, now Pat. No. 9,651,676.

(Continued)

(51) Int. Cl.
*G01S 19/23* (2010.01)
*G01S 19/34* (2010.01)

(52) U.S. Cl.
CPC ............ *G01S 19/23* (2013.01); *G01S 19/235* (2013.01); *G01S 19/34* (2013.01)

(58) Field of Classification Search
CPC ........ G01S 19/23; G01S 19/235; G01S 19/34; G08C 19/22; G08C 15/00; G06F 11/87; G06F 11/1604; G06F 11/187
See application file for complete search history.

(56) References Cited

U.S. PATENT DOCUMENTS 3,803,568 A * 4/1974 Higashide ........... G06F 11/1604
                                                        307/65
3,949,297 A * 4/1976 Hideshima ............. G08C 19/22
                                                        325/37

(Continued)

FOREIGN PATENT DOCUMENTS

WO    WO97/08915 A1 *  3/1997 ............. G08C 15/00

OTHER PUBLICATIONS

Joonhyung Lim et al., "Ultra Low Power RC Oscillator for System wake-up using highly precise Auto-Calibration Technique," 2010, (pp. 274-277).

(Continued)

*Primary Examiner* — Bernarr E Gregory
(74) *Attorney, Agent, or Firm* — The Farrell Law Firm, P.C.

(57) ABSTRACT

Methods, systems, and devices for monitoring a Real Time Clock (RTC) oscillator using Digital Signal Processing (DSP), where a resistance/capacitance (RC) oscillator is configured to output a digital pulse signal and a digital RTC Monitor Integrated Circuit (IC) is configured to monitor the RTC oscillator timing signal using the RC oscillator signal. In one aspect, the RTC Monitor IC includes an RTC input configured to receive the RTC oscillator timing signal; an RC input configured to receive the RC oscillator digital pulse signal; and an RTC reset output configured to output an RTC reset signal when a comparison of the RTC and RC oscillator inputs show the RTC oscillator has missed one or more clock cycles. A single wire input/output for both reset and interrupt signals between circuits is also described.

24 Claims, 6 Drawing Sheets

Related U.S. Application Data

(60) Provisional application No. 61/888,730, filed on Oct. 9, 2013.

(56) References Cited

U.S. PATENT DOCUMENTS

| | | | |
|---|---|---|---|
| 4,644,498 A * | 2/1987 | Bedard | G06F 11/187 327/292 |
| 4,683,570 A * | 7/1987 | Bedard | G06F 11/187 714/797 |
| 6,412,072 B2 | 6/2002 | Little et al. | |
| 6,741,842 B2 | 5/2004 | Goldberg | |
| 6,816,111 B2 | 11/2004 | Krasner | |
| 6,965,754 B2 | 11/2005 | King | |
| 6,985,811 B2 | 1/2006 | Gronemeyer | |
| 7,010,307 B2 | 3/2006 | Abraham | |
| 7,072,631 B2 | 7/2006 | Kitatani | |
| 7,084,810 B2 | 8/2006 | Kitatani | |
| 7,123,190 B1 | 10/2006 | McBurney et al. | |
| 7,143,215 B2 | 11/2006 | Dunstan et al. | |
| 7,167,935 B2 | 1/2007 | Hellberg | |
| 7,454,645 B2 | 11/2008 | Li | |
| 7,500,125 B2 | 3/2009 | Yasumoto | |
| 7,532,159 B2 | 5/2009 | Zhi | |
| 7,548,130 B2 | 6/2009 | Kobayashi | |
| 7,573,422 B2 * | 8/2009 | Harvey | G01S 19/34 342/357.74 |
| 7,586,382 B2 | 9/2009 | Wang | |
| 7,855,581 B2 | 12/2010 | Priel et al. | |
| 8,138,972 B2 | 3/2012 | Underbrink et al. | |
| 8,188,782 B1 | 5/2012 | Lai et al. | |
| 8,446,223 B2 | 5/2013 | Gronemeyer | |
| 2009/0045945 A1 | 2/2009 | Yeh | |

OTHER PUBLICATIONS

J. Popovic et al., "Low Power CMOS RC Oscillators Based on Current Conveyors", Proc. 22nd International Conference on Microelectronics, vol. 2, May 2000, (pp. 691-694).

* cited by examiner

DIGITAL REAL TIME CLOCK MONITOR FOR A GNSS RECEIVER AND SINGLE PIN SIGNALLING FOR POWER-ON RESET AND WAKE-UP INTERRUPT

PRIORITY

This application is Continuation Application of, and claims priority under 35 U.S.C. § 120 to, U.S. patent application Ser. No. 14/328,143, which was filed on Jul. 10, 2014 at the U.S. Patent & Trademark Office, issued on May 16, 2017 as U.S. Pat. No. 9,651,676, and claimed priority under 35 U.S.C. § 119(e) to U.S. Provisional Patent Application Ser. No. 61/888,730 filed on Oct. 9, 2013 at the U.S. Patent & Trademark Office, the entire disclosures of all of which are incorporated herein by reference.

BACKGROUND OF THE INVENTION

1. Field of the Invention

The present invention relates generally to a digital Real Time Clock (RTC) monitor in a Global Navigational Satellite System (GNSS) receiver and having a single pin for both power-on reset and wake-up interrupt signaling between chips, and, more particularly, to a digital RTC monitor that continually assesses whether an RTC oscillator has missing cycles, and to having a single wire connecting two or more chips for power-on reset and wake-up interrupt request signaling between them.

2. Description of the Related Art

Satellite navigational systems provide positional and timing information to earth-bound receivers. Each system has its own constellation of satellites orbiting the Earth, and, in order to calculate its position, a receiver on Earth uses the satellites "in view" (i.e., in the sky above) from that system's constellation. Global Navigational Satellite System (GNSS) is often used as the generic term for such a system, even though such navigational satellite systems include regional and augmented systems—i.e., systems that are not truly "global." The term "GNSS," as used herein, covers any type of navigational satellite system, global, regional, augmented or otherwise, unless expressly indicated otherwise.

The number of GNSS systems, both planned and presently operational, is growing. The widely-known, widely-used, and truly global Global Positioning System (GPS) of the United States has been joined by one other global system, Russia's GLObalnaya NAvigatsionnaya Sputnikovaya Sistema (GLONASS), and is presently being joined by Europe's Galileo and China's BeiDou (also known, in its second generation, as COMPASS) systems—each of which has, or will have, its own constellation of satellites orbiting the globe. Regional systems (those that are not global, but intended to cover only a certain region of the globe) include Japan's Quasi-Zenith Satellite System (QZSS) and the Indian Regional Navigational Satellite System (IRNSS) currently being developed. Augmented systems are normally regional as well, and "augment" existing GNSS systems with, e.g., messages from ground-based stations and/or additional navigational aids. These include the Wide Area Augmentation System (WAAS), European Geostationary Navigation Overlay Service (EGNOS), Multi-functional Satellite Augmentation System (MSAS), and GPS Aided Geo Augmented Navigation (GAGAN). Regional GNSS systems, such as QZSS, can also operate as augmented systems.

Moreover, GNSS capabilities are no longer limited to any particular type of system or device. A GNSS receiver may be implemented in a mobile terminal, a tablet computer, a camera, a portable music player, and a myriad of other portable and/or mobile personal consumer devices, as well as integrated into larger devices and/or systems, such as the electronics of a vehicle. The term "GNSS receiver" as used herein, covers any such implementation of GNSS capabilities in a device or system.

An accurate "clock" is essential for GNSS receiver performance, and the various GNSS functions, e.g., acquisition, tracking, positional computations, etc., rely on maintaining accurate timing to a greater extent than most other functions of electronic devices (accuracy within ±0.05 ms). Thus, a GNSS receiver usually has its own GNSS oscillator, regardless of what system or device it is a part of. However, GNSS oscillators also use much more power than other oscillators. Because of this power usage and the power usage of all of the other GNSS components, e.g., the reception chain, the acquisition, tracking, and computation components, etc., most portable devices having a GNSS receiver turn off one or more GNSS components when the GNSS function is not being used.

Since the GNSS oscillator is also turned off, a cold, warm, or hot restart of the GNSS receiver may be required to obtain accurate measurements when the GNSS receiver is turned on again. However, if the shut down period has been sufficiently short (and/or the user's location has not changed significantly), it is possible to reacquire the previous satellite signals and achieve nearly immediate correlation of the GNSS signals (rather than the several seconds to minutes associated with the hot, warm or cold start procedures). Nearly immediate correlation saves several seconds, thereby saving a substantial amount of the limited power available in a portable GPS receiver unit.

Such nearly immediate (re-)correlation requires keeping time during the period the GNSS oscillator is off. Typically, a Real Time Clock (RTC) circuit is used to maintain rough GNSS time while the rest of the GNSS circuitry is off. Typical RTC circuits are low cost and have poor stability and temperature characteristics. Thus, while they may maintain accuracy within a few seconds over extended periods, which is adequate for hot and warm starts, over shorter periods, the RTC may or may not keep within the required ±0.05 ms, so it is not clear whether immediate (re-)correlation or a warm/hot start is required after such a short off period. Moreover, the RTC may stop due to partial or total loss of power, experience a brownout condition, or miss cycles for some other reason, during the off period. In such circumstances, the GNSS receiver will need to do a cold start, regardless of how long it was off. But the GNSS receiver needs to know if such a problem occurred while it was asleep/off.

Some portable devices having a GNSS receiver use an RTC monitor in the form of analog circuitry to determine if such an RTC problem occurred while the GNSS receiver was off/asleep. However, such analog RTC monitors, which are always on, require power, space, and other limited resources of the portable device. On the other hand, when the power-on reset and wakeup interrupt request functions are shared between two chips, two dedicated wires must be used if the functions must work when the general purpose processors are sleeping, clock-stopped, or otherwise disabled.

Thus, methods, systems, and apparatuses are needed for low-power and efficient RTC monitoring while the GNSS receiver is off, sleeping, and/or otherwise disabled and for providing a single line for power-on reset and wakeup interrupt request functions between two chips.

SUMMARY OF THE INVENTION

Accordingly, the present invention is designed to address at least the problems and/or disadvantages described above and to provide at least the advantages described below. One aspect of the present invention is to provide a digital RTC monitor, which uses less power and area than typical analog monitoring circuitry, for a GNSS receiver. Another aspect of the present invention is to provide a single wire for carrying both the power-on reset and wakeup interrupt signaling functions between two chips is provided.

According to an aspect of the present invention, a portable electronic device having a Global Navigation Satellite System (GNSS) receiver is provided, including a GNSS oscillator configured to output a GNSS timing signal for the GNSS receiver; a Real Time Clock (RTC) oscillator configured to output an RTC timing signal; a resistance/capacitance (RC) oscillator configured to output a digital pulse signal; and a digital RTC Monitor Integrated Circuit (IC) configured to monitor the RTC oscillator timing signal, the digital RTC Monitor IC comprising: an RTC input configured to receive the RTC oscillator timing signal; an RC input configured to receive the RC oscillator digital pulse signal; and an RTC reset output configured to output an RTC reset signal when a comparison of the RTC and RC oscillator inputs show the RTC oscillator has missed one or more clock cycles, wherein the GNSS receiver, when re-starting GNSS operations after the GNSS oscillator has been powered down, does not use the RTC timing signal to re-correlate GNSS operations when the RTC reset signal has been asserted.

According to another aspect of the present invention, an oscillator timing monitor is provided, including a resistance/capacitance (RC) oscillator configured to output a digital pulse signal; a digital Integrated Circuit (IC) configured to monitor a Real Time Clock (RTC) oscillator, the digital IC comprising: a RTC input configured to receive a timing signal output by the RTC oscillator; an RC oscillator input configured to receive the digital pulse signal from the RC oscillator; a RTC reset output configured to output an RTC reset signal when a comparison of the RTC and RC oscillator inputs show the RTC oscillator has missed one or more clock cycles or has become otherwise dysfunctional.

According to yet another aspect of the present invention, an electronic device is provided, including a first circuit which includes a clock input for receiving a first clock signal; a transmitter for generating each of a power-on, reset, and wake-up interrupt signal, wherein each of a power-on, reset, and wake-up interrupt signal are distinguishable by at least a number of cycles of the first clock signal the signal is asserted; and a single pin output for transmitting the each of a power-on, reset, and wake-up interrupt signal to a second circuit; the second circuit comprising: a single pin input for receiving each power-on, reset, and wake-up interrupt signal transmitted by the first circuit; a clock input for receiving a second clock signal, the second clock signal having the same nominal frequency as the first clock signal; and a detector electrically connected to the single pin input and the clock input, the detector configured to detect each the power-on, reset, and wake-up interrupt signals by at least a number of cycles of the second clock signal the signal is asserted; and a single line electrically connecting the single pin output of the first circuit to the single pin input of the second circuit, the single line configured to carry the each of a power-on, reset, and wake-up interrupt signal from the first circuit to the second circuit.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

In general, the present invention relates to a digital monitor of the RTC in a GNSS receiver and using a single pin for both power-on reset and wake-up interrupt signaling between two chips, and, more particularly, to a digital RTC monitor that continually assesses whether the RTC has had any dysfunctions, such as, e.g., total/partial power outage, brownout, missing cycles or variations caused by environmental/system factors, etc., while the GNSS is asleep/off, and to having a single wire between two or more chips for power-on reset and wake-up interrupt request signaling.

Digital RTC Monitor

According to embodiments of the present invention, the Digital RTC Monitor is a dedicated always-on circuit used to monitor the RTC signal. Although embodiments are described herein with reference to a GNSS Receiver, the Digital RTC Monitor according to the present invention can be advantageously implemented in any system where an RTC is used to keep time while a processor is turned off/falls asleep.

Figure 1:
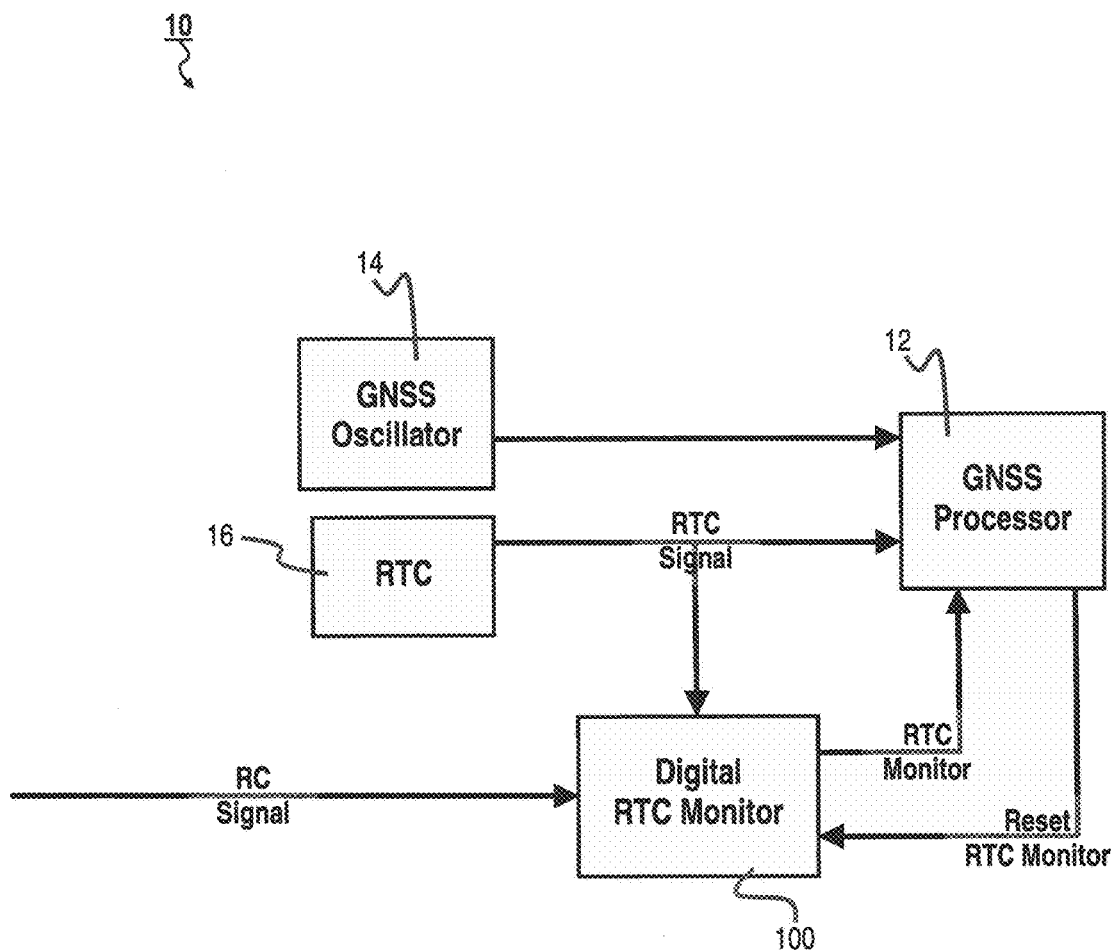
FIG. 1 is a block diagram of a GNSS receiver system with a Digital RTC Monitor according to an embodiment of the present invention.

FIG. 1 is a block diagram of the pertinent components involved with an embodiment of the present invention. In a system which includes a GNSS Receiver 10, there is a GNSS Processor 12, a GNSS Oscillator 14, an RTC clock 16 for keeping time when the GNSS Oscillator 14 is off/asleep, and a Digital RTC Monitor 100 according to an embodiment of the present invention.

Digital RTC Monitor 100 receives a Resistance/Capacitance (RC) oscillator signal and the RTC 16 signal as input. The RC signal is a square wave/output pulse appropriate for input to a digital circuit. The RC oscillator generating the signal may take many forms, some examples of which are listed below, but, in general, it should have extremely low power and very high reliability. Extreme accuracy of frequency is useful, but it not necessary, while reliability and simplicity of design are much more important. Examples of possible RC designs include, but are not limited to, those discussed in Joonhyung Lim, Kwangmook Lee, Koonsik Cho, *Ultra low power RC oscillator for system wake-up using highly precise auto-calibration technique*, 2010 Proceedings of the ESSCIRC, 14-16 Sep. 2010, pp. 274-277; J. Popovic, B. Nikolic, K. W. Current, A Pavasovic, D. Vasiljevic, *Low-power CMOS RC oscillators based on current conveyors*, Proceedings of the $22^{nd}$ Int'l Conference on Microelectronics, 7-14 May 2000, Vol. 2, pp. 691-694, both of which are incorporated by reference in their entirety.

The Digital RTC Monitor 100 uses the RC signal to monitor the RTC signal for aberrations. The Digital RTC Monitor 100 has one or more input/output lines with GNSS Processor 12; what is shown in FIG. 1 is the RTC monitor signal output for the Digital RTC Monitor 100 to send to the GNSS Processor 12 and the RTC monitor reset signal input for the GNSS Processor 12 to send to the Digital RTC Monitor 100.

Figure 2A:
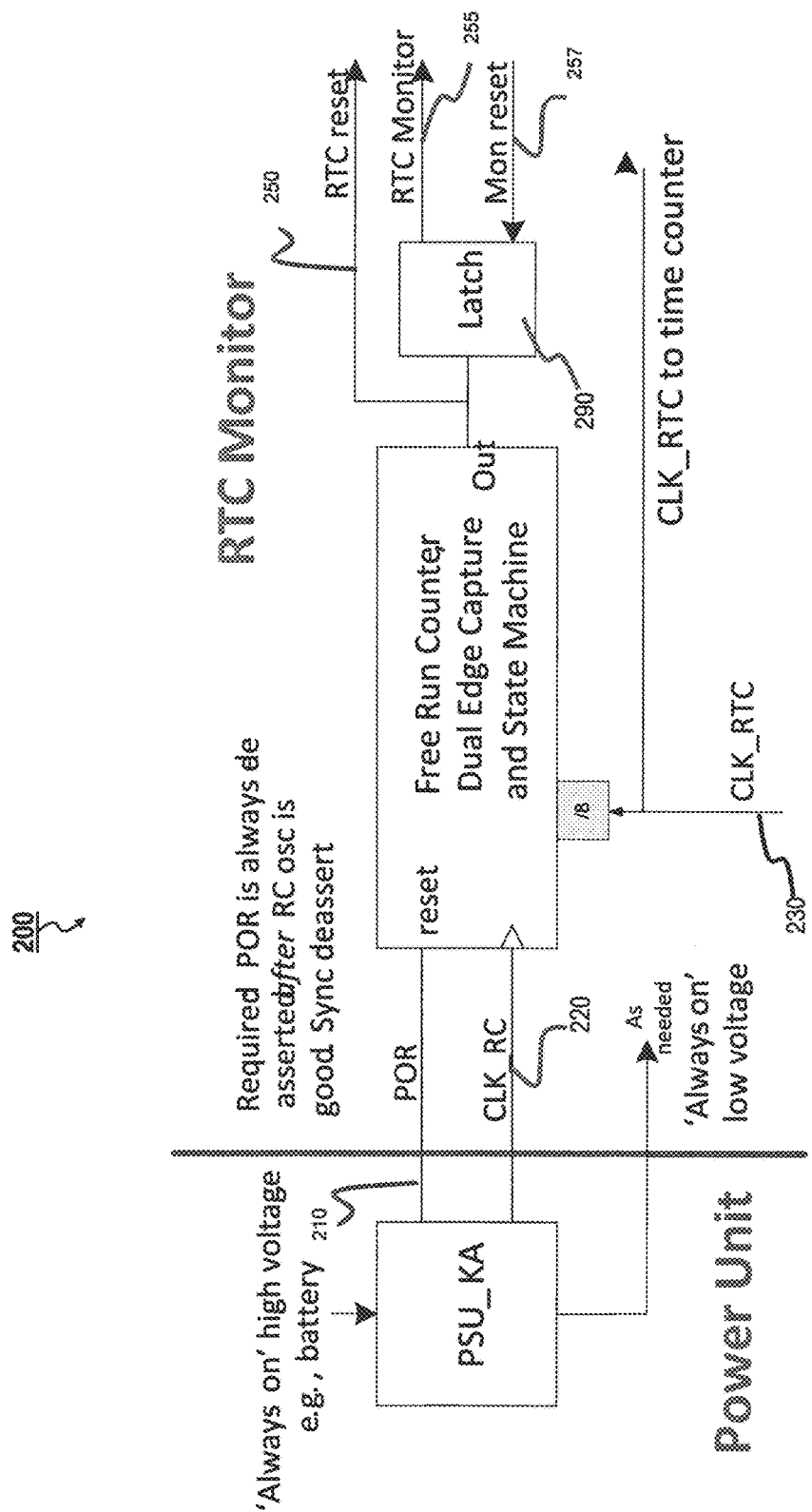
FIG. 2A is a block diagram of a Digital RTC Monitor according to an embodiment of the present invention.

FIG. 2A is a detailed block diagram of a Digital RTC Monitor according to an embodiment of the present invention. Digital RTC Monitor 200 is "always-on" as shown at the bottom of FIG. 2A, but only uses a low voltage, as little as needed, to maintain its operation. A Power-On/Reset (POR) signal 210 resets Digital RTC Monitor 200 whenever the power is turned on and/or the system reset. POR signal 210 remains asserted until CLK_RC signal 220 is stabilized and regular, at which point POR signal 210 is de-asserted. CLK_RC signal 220 is generated by an RC circuit, as discussed above, and is provided as input to the Digital RTC Monitor 200.

CLK_RTC signal 230 shown as input at the bottom of Digital RTC Monitor 200 is the signal being monitored by Digital RTC Monitor 200 for any aberrations, missed cycles, etc. When dysfunction is detected, the RTC reset signal 250 output from Digital RTC Monitor 200 is asserted, thereby informing the GNSS processor that the RTC can not be relied upon for correlating GNSS signals. In this embodiment, the frequency of the CLK_RTC signal 230 is divided by eight when it is input to Digital RTC Monitor 200 (see discussion of timing signals below in reference to FIG. 2B).

RTC reset signal 250 is latched by Latch 290, which thereby asserts, and keeps asserting, RTC Monitor signal 255 until reset by Monitor reset signal 257 from the GNSS processor, in this embodiment. The RTC Monitor signal 255 provides an indication that an RTC reset has occurred, no matter when the GNSS processor wakes up and checks it. In other words, the RTC reset signal is a single flash warning sign, while RTC Monitor signal 255 is a warning light that remains on until the GNSS processor turns it off (thereby indicating it has received the notification) by asserting the Monitor reset signal 257.

In this embodiment, Digital RTC Monitor 200 uses a free run counter and edge capture circuitry to perform its functions (see more details in reference to FIG. 2C below). However, the present invention can be modified, as would be understood by one of ordinary skill in the art, to use a wide variety of circuitry in order to implement a state machine operating in accordance with an embodiment of the Digital RTC Monitor according to the present invention.

Figure 2B:
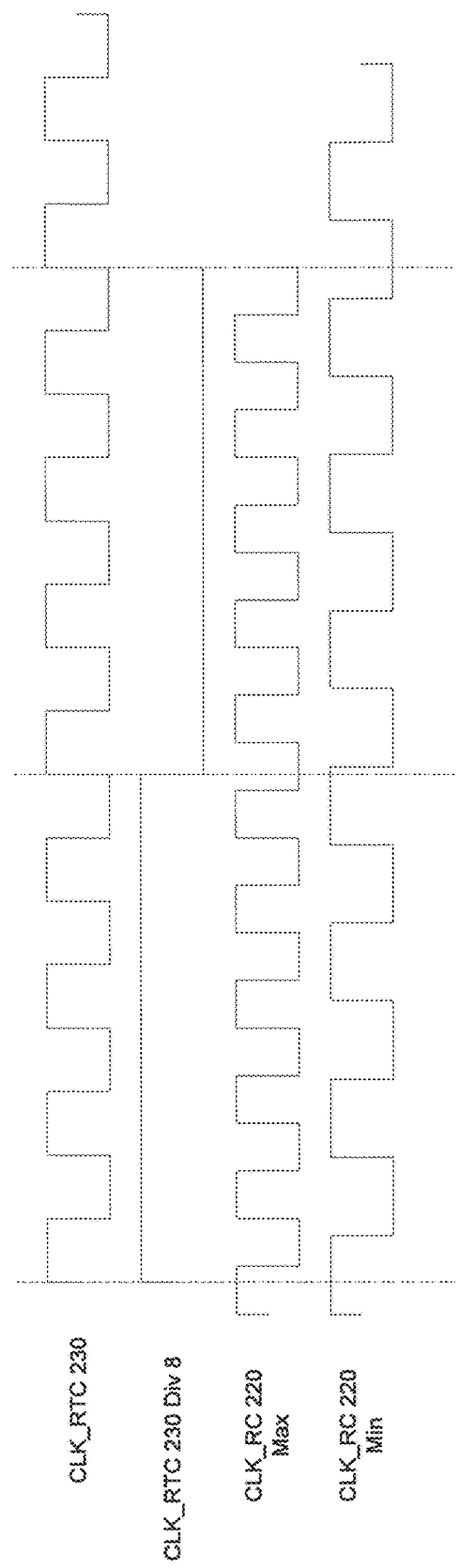
FIG. 2B is a timing diagram showing various signals involved with the operation of the Digital RTC Monitor of FIG. 2A.

FIG. 2B is a timing diagram showing various signals involved with the operation of the Digital RTC Monitor 200. Starting at the top, the timing of the CLK_RTC 230 is shown, while the timing for the CLK_RTC 230 Div 8 signal, which is the frequency-divided CLK_RTC 230 signal input to the Digital RTC Monitor (as shown in FIG. 2A), is shown directly beneath. CLK_RTC 230 is the signal being monitored. Using the CLK_RTC 230 Div 8 signal both simplifies the design; however, embodiments of the present invention do not require such frequency division, and its implementation would depend on the features and complexity of the frequency counters. CLK_RC 220 acts as the reference or "known-good" signal for the Digital RTC Monitor. As discussed above in reference to the RC circuit construction, CLK_RC 220 is very reliable and "always there," but not very accurate in terms of frequency. In FIG. 2B, this variation is shown by the higher frequency CLK_RC 220 Max and the lower frequency CLK_RC 220 Min at the bottom of the timing diagram.

Figure 2C:
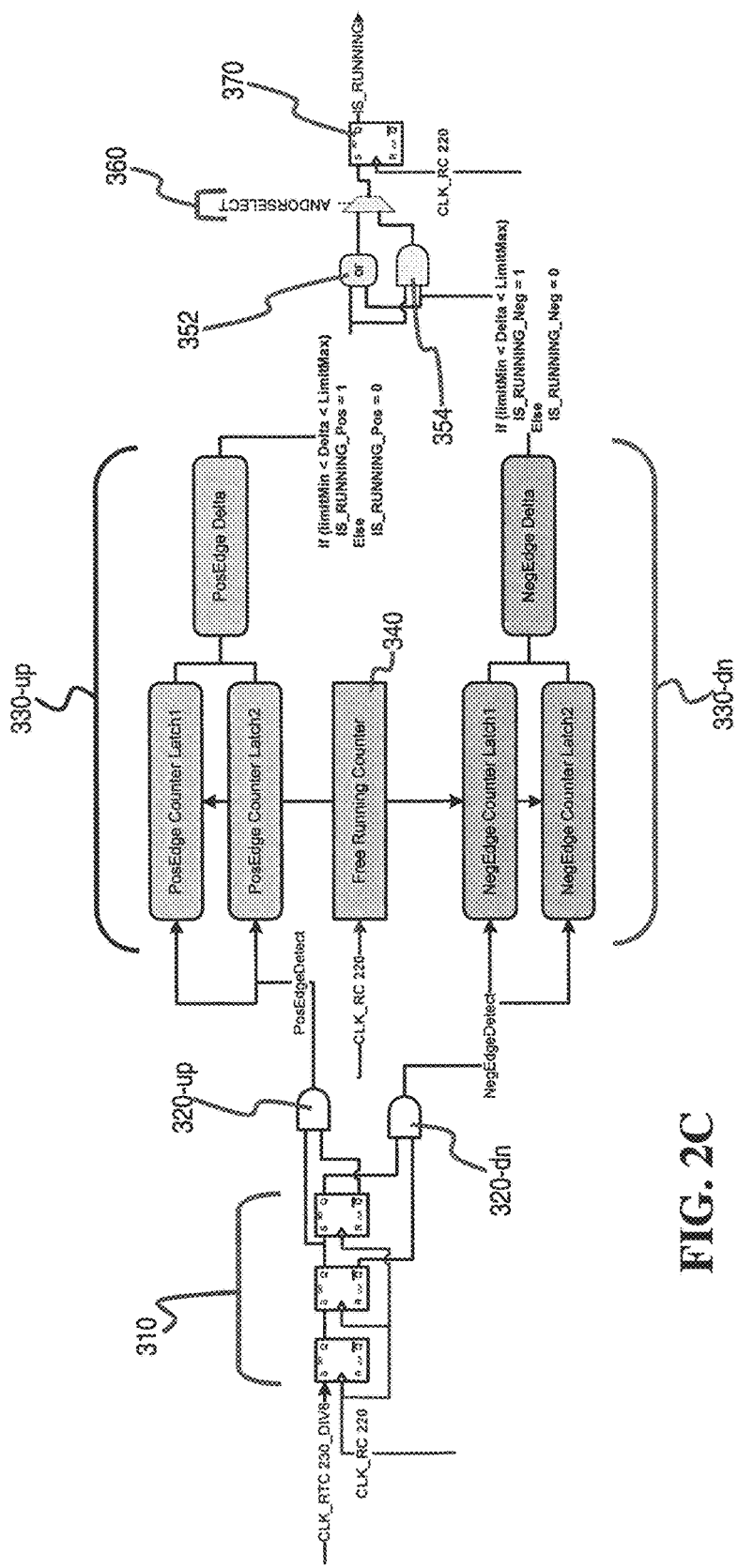
FIG. 2C is a block/function diagram illustrating one possible implementation of the Digital RTC Monitor of FIG. 2A.

FIG. 2C is a block/function diagram illustrating one possible implementation of the Digital RTC Monitor of FIG. 2A. The first of a series of three (3) clocked SR latches or flipflops 310 at the input of the Digital RTC Monitor according to the embodiment shown in FIG. 2C takes the CLK_RTC 230 DIV_8 in the S input and CLK_RC 220 as the timing input. All three (3) SR latches/flipflops 310 in the Digital RTC Monitor according to the embodiment shown in FIG. 2C take CLK_RC 220 as their timing input. Although not shown in FIG. 2C, POR signal 210 is another input to the Digital RTC Monitor and acts as the required reset signal for the digital circuits shown in FIG. 2C. It is required because, like any digital state machine, the circuits can lockup (particularly subsequent to a start-up with completely randomized states) and would thus need to be forced into a known starting state.

Different signals from the three SR latches/flipflops 310 are input to two AND digital gates 320, an upper AND gate 320-*up* whose output is PosEdgeDetect and a lower AND gate 320-*dn* whose output is NegEdgeDetect. In FIG. 2C, the top logic 330-*up* (with input PosEdgeDetect and output IS_RUNNING_Pos) detects positive edges, while the bottom logic 330-*dn* (with input NegEdgeDetect and output IS_RUNNING_Neg) detects negative edges. Even with the wide variation in the CLK_RC 220 signal (as shown by CLK_RC 220 Max and CLK_RC 220 Min in FIG. 2B), the positive edge logic 330-*up* should successfully detect most instances of the CLK_RTC 230 Div 8 signal changing from negative to positive, while the negative edge logic 330-*dn* should successfully detect most instances of the CLK_RTC 230 Div 8 signal changing from positive to negative. The Free Running Counter 340 counts the number of CLK_RC 220 cycles between two identical edges (either the rising or the falling edge). In this embodiment, two different logic circuits 330-*up* and 330-*dn* are used in order to increase the speed of detection by doubling the number of checks. In other embodiments, only one logic circuit 330, or perhaps multiple logic detection circuits 330-*n*, may be used.

As shown in FIG. 2C, when (limitMin<Delta<limitMax) for PosEdge Delta, the output of the logic 330-*up* is 1 (i.e., IS_RUNNING_Pos=1), but if not, the top logic 330-*up* outputs 0 (i.e., IS_RUNNING_Pos=0). Similarly, when (limitMin<NegEdge_Delta<limitMax) for NegEdgeDelta, the output of the logic 330-*dn* is 1 (i.e., IS_RUNNING_Neg=1), but if not, the bottom logic 330-*dn* outputs 0 (i.e., IS_RUNNING_Neg=0). The values for limitMin and limitMax are defined by, inter alia, the variation in CLK_RC of the particular embodiment of the present invention (which can be as much as 45%). Based on this variation, the values for limitMin and limitMax will be greater or smaller.

The IS_RUNNING_Pos output of logic 330-*up* and IS_RUNNING_Neg output of logic 330-*dn* are both input to both an OR gate 352 and an AND gate 354. The AND gate 354 is only asserted when both IS_RUNNING_Pos and IS_RUNNING_Neg equal 1, while the OR gate 352 is asserted when either IS_RUNNING_Pos and IS_RUNNING_Neg equal 1. ANDORSELECT 360 selects either the output of AND gate 354 or OR gate 352 for input to the final SR flipflop 370. In this embodiment, ANDORSELECT 360 is used to make the error detection either robust or fast. When AND gate 354 is selected, the detection circuit is robust because it is only triggered when both the 330-*up* and 330-*dn* logic detect an error; when OR gate 352 is selected, the detection circuit is fast because it is triggered when either the 330-*up* or 330-*dn* logic detect a problem. SR flipflop 370 latches the output of ANDORSELECT 360 and provides it as output detection signal IS_RUNNING.

The embodiment in FIG. 2C is merely an example, and a Digital RTC Monitor may be implemented in a variety of ways, as would be understood by one of ordinary skill in the art. For example, in another embodiment of the present invention, the Digital RTC Monitor may be implemented with one or more up/down counters. In such an embodiment, the Digital RTC Monitor receives the same inputs, i.e., POR 210, CLK_RC signal 220, and CLK_RTC signal 230; however, Digital RTC Monitor itself is implemented as an up/down Counter, with CLK_RC 220 being the DN input and CLK_RTC 230 Div 8 being the UP input. Thus, the counter would count every pulse of CLK_RC 220 as a −1 and every pulse of CLK_RTC 230 Div 8 as a +1. In such an embodiment, the up/down Counter would be a 3 bit counter, so it can count for 8 cycles and then start again at zero. Since there is one −1 from CLK_RC 220 for every four +1's from CLK_RTC Div_8, the up/down counter should never reach 8 (or 7=111 in binary, since the count starts with 000). When the output count from the up/down counter exceeds a threshold—in this embodiment, 7 (i.e., 6=110 in binary), a CLK_RTC 230 timing error/aberration has been detected.

In general, embodiments of the present invention using one or more up/down counters rely on the expected ratio of the two clock frequencies CLK_RTC and CLK_RC. During a defined number of cycles, there should be a certain number a of CLK_RC cycles and a certain number b of CLK_RTC cycles (either clock signal may be modified for this purpose, such as the frequency-divided CLK_RTC 230 DIV_8). Thus, keeping a count during a predefined number of cycles, where one clock signal is added and the other clock signal subtracted, should always fall within certain limits. If the threshold is exceeded, CLK_RTC has had a failure; if the threshold is not exceeded, the CLK_RTC has kept within tolerances. Since CLK_RC is often not very accurate, quite a lot of tolerance is needed to define the acceptable range of CLK_RTC. In embodiments where CLK_RC is more accurate, the acceptable tolerance or range for the counter output value could be tightened.

As shown by the specific embodiments discussed above, embodiments of the present invention use an RC oscillator and digital circuit(s) to monitor an RTC oscillator for missing cycles.

Advantages of the embodiments according to the present invention include, but are not limited to:

Low power;

Small area: Digital RTC Monitor can have smaller circuit area in more advanced IC process technology because digital circuits can shrink better than analog;

Continuous test for missing cycles;

Power consumption of digital circuits also scales downward better than analog; and Dual-edge capture circuit is very versatile and is as accurate as possible, limited only by the RC frequency accuracy.

Because the Digital RTC Monitor is an always-on circuit, POR 210 is needed to force the circuits to begin in a known state after power-on (e.g., battery insert).

Single Wire Between Two Chips

According to embodiments of the present invention, power-on reset and wakeup interrupt signaling between two or more chips can be implemented using only one pin on each of the chips and a single wire.

Figure 3A:
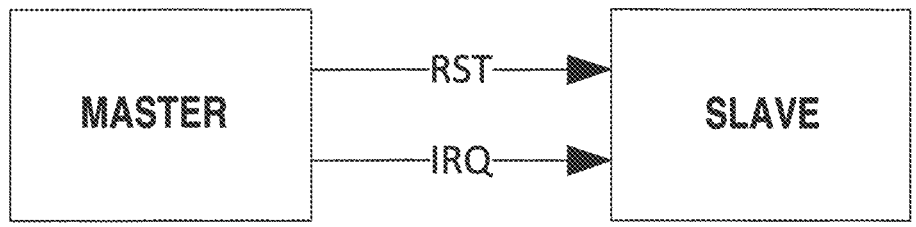
FIG. 3A is a block diagram showing the conventional reset and interrupt signaling between a master chip/circuit and slave chip/circuit.

FIG. 3A is a block diagram showing the conventional power-on/reset (RST) and wakeup/interrupt request (IRQ) signaling between a master chip/circuit and slave chip/circuit. Two dedicated lines are required, each of which needs its own dedicated pin on each chip/circuit, resulting in each chip/circuit having two pins used for input/output of relatively simple messaging/signals—pins which could be used for more complex and/or additional data input/output.

Figure 3B:
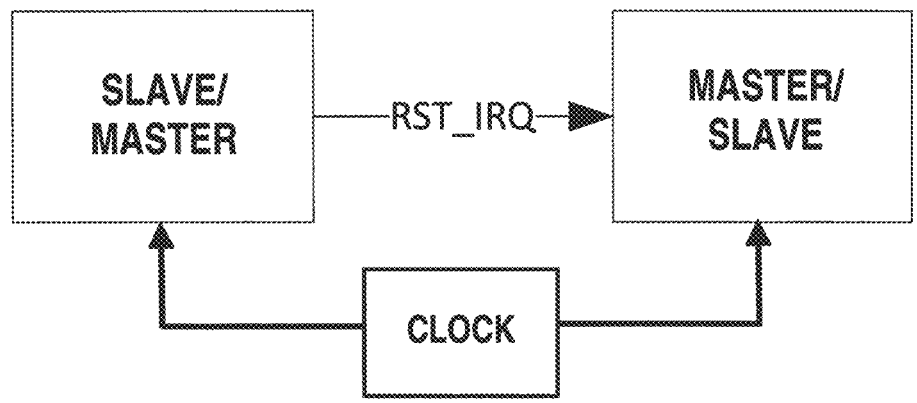
FIG. 3B is a block diagram showing reset and interrupt signaling using only a single wire between a slave chip/circuit and master chip/circuit, and only a single pin on each chip/circuit, according to an embodiment of the present invention.

FIG. 3B is a block diagram showing reset and interrupt signaling using only a single wire between a slave chip/circuit and master chip/circuit according to an embodiment of the present invention. In FIG. 3B, the slave chip/circuit is transmitting the combined power-on/reset and wakeup/interrupt request (RST_IRQ) signaling on a single wire to the master chip/circuit, thereby providing the capability for a slave chip/circuit to reset, power-up, and/or otherwise interrupt the master chip/circuit. Although it is the slave chip/circuit transmitting the RST_IRQ signals to the master chip/circuit, it can be the master chip/circuit transmitting to the slave chip/circuit in other embodiments. Moreover, in other embodiments (such as shown in FIG. 3C discussed below), the single wire may carry bidirectional RST_IRQ signaling between the chips/circuits.

In FIG. 3B, the chips/circuits distinguish the RST from the IRQ signals transmitted on the same RST_IRQ wire by the time/width of the signal transmitted as compared with a clock signal generated by a clock. For example, the RST signal may be ON for nine clock cycles, while the IRQ signal is ON for less than one clock cycle. Thus, although using the same wire, the signals can be distinguished. Moreover, different types of interrupts, resets, etc., signals may be distinguished by using various lengths or patterns. However, the more complex the signaling protocol, the more circuitry and power will be required to receive and appropriately detect the separate signals. In the embodiment discussed in reference to FIGS. 4A-4B below, a low-power, low-complexity detector circuit is implemented for detecting a relatively simple two-signal protocol.

Figure 3C:
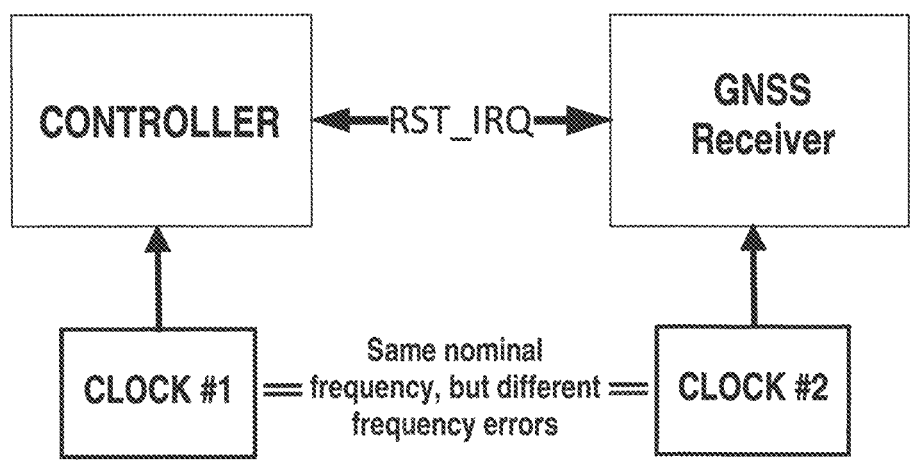
FIG. 3C is a block diagram showing bidirectional reset and interrupt (RST_IRQ) signaling using only a single wire between a controller and a GNSS receiver in the same electronic device, according to an embodiment of the present invention.

FIG. 3C is a block diagram showing bidirectional reset and interrupt (RST_IRQ) signaling using only a single wire between a controller and a GNSS receiver in the same electronic device. In such an embodiment, a collision avoidance scheme will need to be used, as would be understood by one of ordinary skill in the art, as well as a passive pull (thereby allowing the wired-OR logic function to be used).

In FIG. 3C, two different clocks (CLOCK #1, CLOCK #2) having the same nominal frequency are used instead of a common clock. In embodiments using different clocks with the same nominal frequency, the only requirement is that pulse widths are uniquely distinguishable at both ends allowing for the maximum possible clock frequency difference.

Figure 4A:
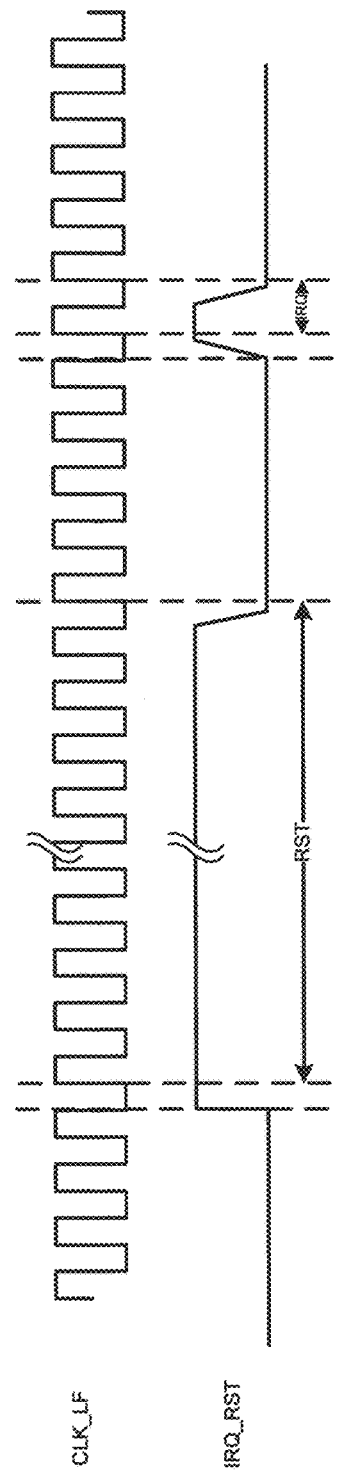
FIG. 4A is a timing diagram showing an example of reset and interrupt signaling using only a single wire and a single pin on each chip/circuit, according to an embodiment of the present invention.

FIG. 4A is a timing diagram showing an example of reset and interrupt signaling using only a single wire and a single pin on each chip/circuit (such as the setup in FIG. 3B), according to an embodiment of the present invention. On top, the common clock signal CLK_LF is shown, while the IRQ_RST line is shown on the bottom, where first a reset signal (RST) is transmitted and then an interrupt signal (IRQ). As shown in FIG. 4A, the RST and IRQ signals have fundamentally different lengths and shapes, which help the detector circuit to distinguish these signals from each other.

Figure 4B:
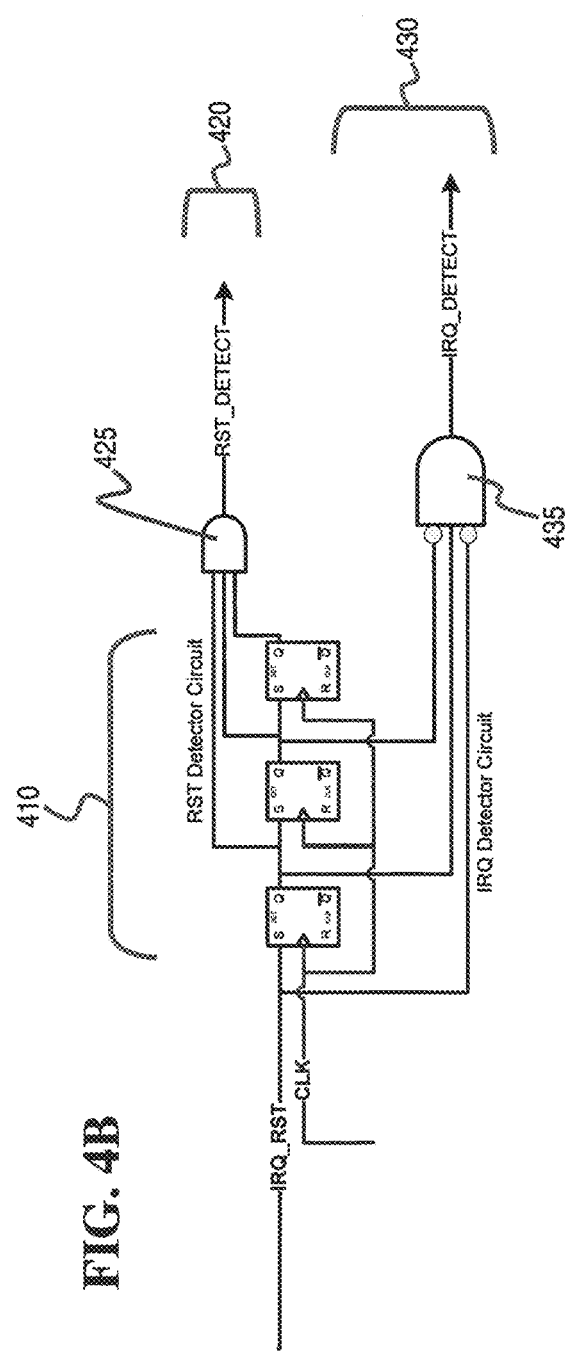
FIG. 4B is a block/function diagram illustrating one possible implementation of a reception circuit for receiving and processing reset and interrupt signaling using only a single wire and a single pin on each chip/circuit, according to an embodiment of the present invention.

FIG. 4B is a block/function diagram illustrating one possible implementation of a detector circuit for distinguishing reset and interrupt signaling using only a single wire and a single pin on each chip/circuit, according to an embodiment of the present invention. The IRQ_RST signal is input into three (3) SR latches/flipflops 410, which provides the input for an RST detection circuit 420 on the top and an IRQ detection circuit 430 on the bottom. In essence, the three SR latches/flipflops 410 provide three consecutive latchings of the IRQ_RST signal to both the RST and IRQ detector circuits 420/430. Specifically, the RST detection circuit 420 operates by the three SR latches/flipflops providing three consecutive latchings (i.e., according to three pulses of the CLK_LF clock) of the RST_IRQ signal to the 3-input AND gate 425. Since the output of the 3-input AND gate 425 is only asserted when all 3 inputs are asserted, an RST_DETECT signal will only be generated when the RST_IRQ signal has been asserted over at least three CLK_LF clock cycles (i.e., three consecutive latchings). By these means, the RST signal can be detected and the RST_DETECT signal will be asserted.

Unlike the RST signal, the IRQ signal is asserted for less than a complete CLK_LF clock cycle, as shown in FIG. 4A. Thus, the IRQ detection circuit 430 operates by having the three SR latches/flipflops 410 providing the same three consecutive latchings but changing the logic of the inputs of AND gate 435. Specifically, 3-input AND gate 435 negates the input of the first and third latchings, while allowing the second (middle) latching to remain unchanged. In effect, this means the output of AND gate 435 will only be asserted when a positive latching is between two negative latchings. As shown in FIG. 4A, this is exactly what occurs when the IRQ signal is sent. Thus, the IRQ_DETECT signal output from AND gate 435 will accurately indicate when the IRQ signal is sent on the IRQ_RST signal line. Moreover, having both circuits 420/430 allows a single line to be used for both the RST and the IRQ signals.

As shown, embodiments of the present invention use only a single pin (and a single wire between the two chips) whereas normally two dedicated pins (and wires) are used for the same functions in implementations that require those functions to work when the processor is sleeping, clock-stopped, or otherwise disabled. Both ends of the signal wire need to have a common/same frequency clock which is used to generate/measure pulse width. If the clock is low frequency then the clock power can be low, as long as relatively slow RST and IRQ signal detection is acceptable.

In other embodiments, an embedded clock and signal may be used to save yet another pin compared to the common/same frequency-clock embodiments shown above. For example, the frequency of the clock itself could indicate one or more signals: 1× clock frequency="no message"; ½ clock frequency=RST; and 2× clock frequency=IRQ. This would be more complicated and require higher power to implement because a clock recovery circuit would be needed. Also, it would be difficult to implement such an embedded clock/RST_IRQ embodiment in a bidirectional manner.

As mentioned above, embodiments of the present invention can also work with independent clocks, as long as they have the same nominal frequency, and pulse widths are still uniquely distinguishable under the maximum possible clock frequency difference. Furthermore, bidirectionality is possible if passive pull is used and some form of collision avoidance is adopted.

Under the same circumstances, i.e., passive pull and collision avoidance, embodiments of the present invention may be implemented with multiple chips/circuits.

While several embodiments have been described, it will be understood that various modifications can be made without departing from the scope of the present invention. Thus, it will be apparent to those of ordinary skill in the art that the invention is not limited to the embodiments described, but can encompass everything covered by the appended claims and their equivalents.

What is claimed is:

1. A portable electronic device having a Global Navigation Satellite System (GNSS) receiver, comprising:
    a Real Time Clock (RTC) oscillator which outputs an RTC timing signal;
    a digital Integrated Circuit (IC) monitor which outputs a reset signal when monitoring indicates that the RTC oscillator has missed at least one clock cycle; and
    a GNSS oscillator which outputs a GNSS timing signal and which, when re-starting GNSS operations after the GNSS oscillator has been powered down, does not use the RTC timing signal to re-correlate GNSS operations when the reset signal has been asserted by the digital IC monitor.

2. The portable electronic device of claim 1, further comprising:
    a resistance/capacitance (RC) oscillator which outputs an RC digital pulse signal,
    wherein the digital IC monitor uses the RTC timing signal and the RC digital pulse signal as input for monitoring whether the RTC oscillator has missed at least one clock cycle or has become otherwise dysfunctional.

3. The portable electronic device of claim 2, wherein the digital IC monitor outputs the reset signal when a comparison of the RTC timing signal and RC digital pulse signal shows that the RTC oscillator has missed at least one clock cycle.

4. The portable electronic device of claim 3, wherein the digital IC monitor is configured to divide a frequency of the RTC timing signal before processing and comparing the RC digital pulse with the RTC input by the digital IC monitor.

5. The portable electronic device of claim 1, wherein the digital IC monitor comprises one or more flipflops, digital logic gates, counters, and multiplexors.

6. The portable electronic device of claim 1, wherein the digital IC monitor comprises:
a latch which, when it receives the reset signal, asserts and maintains a monitor signal,
wherein, when re-starting GNSS operations after the GNSS oscillator has been powered down, the monitor signal indicates if the reset signal was asserted during a period when the GNSS oscillator has been powered-down.

7. The portable electronic device of claim 6, wherein the latch de-asserts the monitor signal when a monitor reset signal is received, and wherein the monitor reset signal is asserted after GNSS operations are re-started and re-correlated.

8. The portable electronic device of claim 1, wherein the digital IC monitor receives a Power-On/Reset (POR) signal when the portable electronic device is reset or powered on.

9. The portable electronic device of claim 1, wherein the RTC oscillator consumes less power than the GNSS oscillator and maintains timing while the GNSS oscillator is powered down.

10. The portable electronic device of claim 1, wherein the digital IC monitor also outputs a reset signal when monitoring indicates that the RTC oscillator malfunctions in a way other than missing at least one clock cycle.

11. An electronic apparatus, comprising:
a first circuit capable of generating any of a power-on signal, a reset signal, and a wake-up interrupt signal, wherein each of the power-on signal, the reset signal, and the wake-up interrupt signal is distinguishable by a number of clock cycles each of the power-on signal, the reset signal, and the wake-up interrupt signal is asserted;
a single line operable to carry any of the power-on signal, the reset signal, and the wake-up interrupt signal from the first circuit to a second circuit; and
the second circuit capable of receiving any of the power-on signal, the reset signal, and the wake-up interrupt signal over the single line from the first circuit,
wherein the second circuit determines whether a received signal is the power-on signal, the reset signal, or the wake-up interrupt signal by detecting the number of clock cycles of the power-on signal, the reset signal, or the wake-up interrupt signal the received signal has asserted.

12. The electronic apparatus of claim 11, wherein a maximum possible clock frequency difference caused by frequency errors of both a clock of the first circuit and a clock of the second circuit are such that clock signal pulse widths are uniquely distinguishable at both ends of the single line.

13. The electronic apparatus of claim 11, wherein the single line comprises a bus, and wherein there are a plurality of second circuits each capable of receiving any of the power-on signal, the reset signal, and the wake-up interrupt signal transmitted by the first circuit.

14. The electronic apparatus of claim 11, wherein the single line is operable to carry signals bidirectionally, and wherein the second circuit is capable of generating and transmitting any of the power-on signal, the reset signal, and the wake-up interrupt signal over the single line to the first circuit.

15. A method of monitoring a Real Time Clock (RTC) timing signal by a portable electronic device having a Global Navigation Satellite System (GNSS) receiver, comprising:
outputting, by an RTC oscillator, the RTC timing signal;
if monitoring indicates that the RTC oscillator has missed at least one clock cycle, outputting, by a digital Integrated Circuit (IC) monitor, a reset signal; and
if the reset signal has been output by the digital IC monitor, not using, by a GNSS oscillator, the RTC timing signal to re-correlate GNSS operations when re-starting GNSS operations after the GNSS oscillator has been powered down.

16. The method of claim 15, further comprising:
outputting, by a resistance/capacitance (RC) oscillator, an RC digital pulse signal,
monitoring, by the digital IC monitor, whether the RTC oscillator has missed at least one clock cycle using the RTC timing signal and the RC digital pulse signal.

17. The method of claim 16, wherein the digital IC monitor outputs the reset signal when a comparison of the RTC timing signal and RC digital pulse signal shows that the RTC oscillator has missed at least one clock cycle.

18. The method of claim 17, further comprising:
dividing a frequency of the RTC timing signal before processing and comparing the RC digital pulse signal with the RTC input.

19. The method of claim 15, wherein the digital IC monitor comprises one or more flipflops, digital logic gates, counters, and multiplexors.

20. The method of claim 15, further comprising:
asserting, by the digital IC monitor when it receives the reset signal, and maintaining a monitor signal and
determining, when re-starting GNSS operations after the GNSS oscillator has been powered down, if the reset signal was asserted during a period when the GNSS oscillator has been powered-down using the monitor signal.

21. The method of claim 20, further comprising:
after GNSS operations are re-started and re-correlated, asserting a monitor reset signal; and
de-asserting the monitor signal when the monitor reset signal is asserted.

22. The method of claim 15, further comprising:
receiving, by the digital IC monitor, a Power-On/Reset (POR) signal when the portable electronic device is reset or powered on.

23. The method of claim 15, wherein the RTC oscillator is a lower power oscillator and the GNSS oscillator is a higher power oscillator, further comprising:
maintaining, by the RTC oscillator, timing while the GNSS oscillator is powered down.

24. The method of claim 15, further comprising:
if monitoring indicates that the RTC oscillator has become dysfunctional in a manner other than missing at least one clock cycle, outputting, by the digital Integrated Circuit (IC) monitor, the reset signal.

* * * * *